Figure 1:
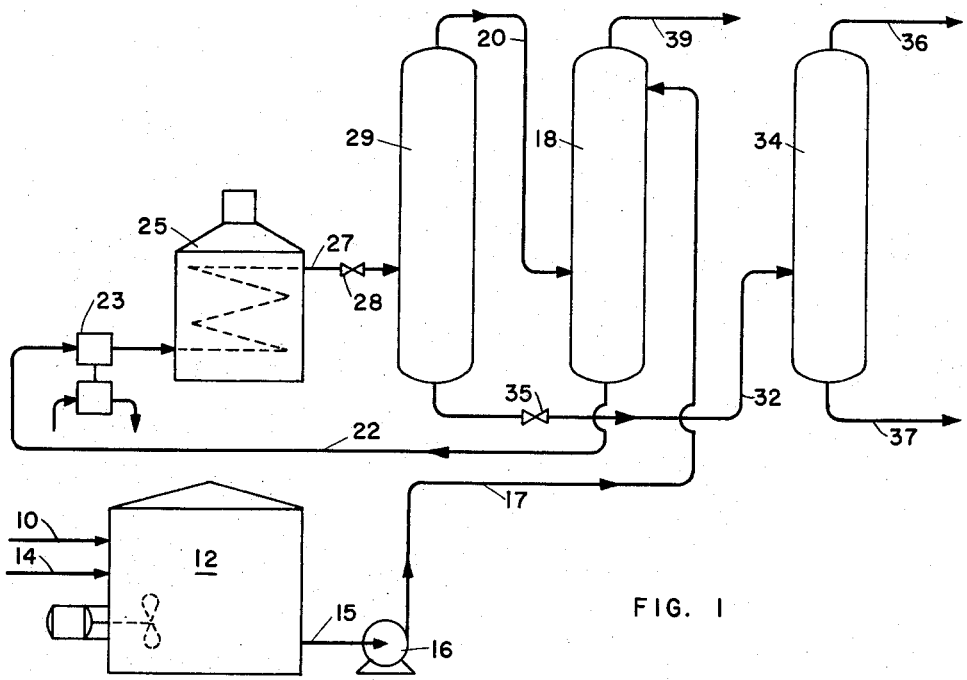

July 21, 1959  G. F. DE RIDDER ET AL  2,895,895

PRODUCTION OF CARBON BLACK OIL

Filed Jan. 2, 1958

INVENTORS:
GYSBERT F. DE RIDDER
WILLIAM P. BRYAN
BY: *[signature]*
THEIR ATTORNEY 2,895,895

PRODUCTION OF CARBON BLACK OIL

Gysbert F. De Ridder and William P. Bryan, Houston, Tex., assignors to Shell Development Company, New York, N.Y., a corporation of Delaware Application January 2, 1958, Serial No. 706,654

5 Claims. (Cl. 208—40)

This invention concerns hydrocarbon conversion and more particularly provides an improved process for the production of a high aromatic base oil especially suitable for the manufacture of carbon black of high quality.

The carbon black industry has expanded rapidly during the past decade or two as the material has become more widely used, especially as a filler to improve the wearing qualities of natural and synthetic rubbers. Snythetic rubbers require larger amounts of this material than natural rubber and hence, with the increasing consumption of synthetic rubbers, it is understandable why the demand for carbon black has increased. During the expansion period, technological advancements have resulted in a shift from the older natural gas processes to more recently developed aromatic base oil processes for the production of carbon black. This shift in part may be attributed to the greater recovery efficiencies from the available carbon in base oil and in part to an increased demand for natural gas as a consumer heating fuel. It has also been demonstrated that the carbon black obtainable from petroleum oil is better suited for synthetic rubber than carbon blacks made from other raw materials.

This increased demand for carbon blacks manufactured from non-natural gas sources has prompted the investigation of various aromatic base materials as possible sources for use in this field. There are, of course, various aromatic enriched streams available in a modern petroleum refinery; however, unfortunately, most of these materials are not suitable for carbon black oils in their present forms. The specifications for good carbon black oils are quite exacting and there should not be appreciable deviation from the specifications especially where the oil is to be used in the manufacture of carbon black for rubber compounding. The physical properties and component make-up of the oil must meet stringent specifications. For example, if the asphaltene content be too high, the oil intended for carbon black use will not vaporize in the fashion required and the asphaltene component may appear in the product carbon black in the form of rather large size unconverted clumps. It is most important that the aromaticity be sufficiently high. A particularly desirable high molecular weight carbon black oil will have the following general limiting specifications:

| | |
|---|---|
| Gravity, ° A.P.I. | 0 to 4. |
| Viscosity, SSU, at 210° F. | 30 to 110. |
| Asphaltenes, percent w. | 10.0 max. |
| Carbon residue, percent w, Conradson. | 15.0 max. |
| Correlation index. | 110 to 130. |
| Sulfur, percent w. | 2.0 max. |
| Ash, percent w. | 0.05 max. |
| Pour point, ° F. | 50 max. |

The correlation index referred to above was developed by the United States Bureau of Mines and denotes aromaticity of an oil. A higher numerical value is evidence of a more aromatic oil. The index is calculated from the formula:

$$C.I. = \frac{48640}{K} + 473.7G - 456.8$$

where:

C.I.=Bureau of Mines correlation index
$K$=average boiling point (° K.) of the fraction
$G$=specific gravity at 60° F./60° F.

It will be appreciated why in view of the exacting specification as to gravity, viscosity, correlation index, etc. so many aromatic enriched sources are unavailable as carbon black oils. It has been suggested that various aromatic enriched fractions could be cracked to modify them to a form suitable for this use. Two of the more common aromatic sources present in most refineries are catalytically cracked gas oils and lubricating oil extracts. Neither of these materials in its available form is desirable in carbon black manufacture nor does either of them provide a good carbon black oil when they are subjected to thermal cracking even under rather severe conditions.

It is an object of this invention to provide a commercially practical process for converting catalytically cracked gas oils and straight run aromatic extracts such as lubricating oil extracts to a form suitable for use in carbon black manufacture.

It is a further object of this invention to provide a process for upgrading catalytically cracked gas oils and lubricating oil extract stocks to a product having a considerably enhanced value.

It is still a further object of this invention to provide an improved process for the production of carbon black oil which also permits the optimum recovery of gasoline.

Figure 2:
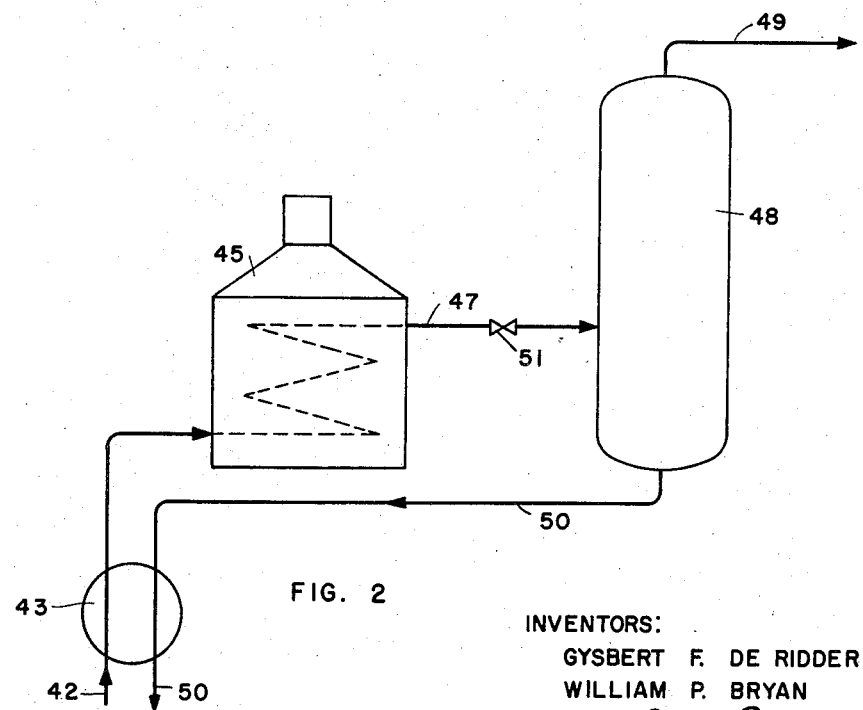

Further objects and advantages of the invention will be apparent from description of the invention and the accompanying drawing, wherein:

Fig. 1 is a flow diagram of a system for the practice of a preferred embodiment of the improved process; and Fig. 2 is a second flow diagram of another system for performing the process.

It has now been found that it is possible to thermally crack under highly severe conditions a mixture of catalytically cracked gas oil and straight run aromatic extracts such as lubricating oil extracts to obtain a material which is especially suitable for carbon black manufacture. Surprisingly, neither of these materials when thermally cracked alone under like conditions will supply a suitable carbon black oil.

When either of the materials is thermally cracked alone, the resulting product is deficient in the correlation index specification Moreover, in the instance of the lubricating oil extract the resulting material also generally fails to meet the viscosity requirement and in the case of the catalytically cracked gas oil the product usually fails to meet the gravity standard. However, when the two materials are admixed and subjected to substantially the same thermal cracking conditions the end product is more suitable for carbon black manufacture and will generally meet (or demonstrate a significant improvement) the aforementioned conditions as to gravity, viscosity, asphaltene content, carbon residue, correlation index, sulfur content, ash content and pour point. Additionally, it has been discovered that the preferred conditions for the production of the carbon black oil from the two materials give optimum gasoline recovery.

In the improved process of the invention there is prepared a mixture containing substantial proportions of both a catalytically cracked gas oil and a straight run aromatic extract, preferably a lubricating oil extract. The mixture preferably comprises the two components in a weight ratio between 70–30 and 30–70, with each of the components containing at least 30% by weight of aromatic hydrocarbons. The prepared mixture is subjected to a severe thermal cracking operation and the light materials are separated from the cracked mixture to obtain a high aromatic residue suitable for carbon black manufacture which has overall carbon black base oil characteristics superior to that obtainable by the thermal cracking of either of the components separately. The flashing of the thermally cracked mixture to substantially atmospheric pressure will generally suffice to remove the lighter materials leaving the carbon black base oil product, though other well known separation techniques may be used.

In a preferred embodiment of the process, the mixture is subjected to thermal cracking at a temperature in the range of 910–950° F. and preferably at a temperature between 920–935° F. and at a pressure above 250 p.s.i.g. and preferably in the range of 300–550 p.s.i.g. The residence time of the oil in the cracking zone is held to a minimum and preferably to a period less than 30 minutes to avoid the formation of an excessive asphaltene content. The cracked mixture is then passed to a separation zone which is maintained at a pressure appreciably lower than the cracking zone to separate the cracked mixture into a vapor phase and a liquid phase, with the vapor phase preferably comprising from 40 to 60% of the cracked mixture to the zone. The vapor phase so formed is removed to a dephlegmation zone where it is fractionated into an overhead gas stream containing unstabilized pressure distillate (gasoline) and lighter materials, and a liquid light oil fraction which is removed from the bottom of the dephlegmation zone and preferably recycled to the cracking furnace. Preferably, the feed made up of the catalytically cracked gas oil and lubricating oil extract is introduced to a top section of the dephlegmation zone where it flows downwardly in countercurrent flow to the rising vapor. In this manner, the feed is heated and the light oil fraction previously mentioned becomes admixed with the feed proper and is recycled to the cracking zone. A recycled ratio of the light oil fraction to the feed in the range of 1.5:1 to 3.5:1 is generally satisfactory. The liquid phase from the earlier mentioned separation zone is withdrawn to a flashing zone, wherein the pressure on the liquid is reduced substantially to atmospheric, thereby flashing light ends from the liquid to provide a high aromatic residue of acceptable gravity and otherwise suitable for carbon black manufacture. The overall characteristics of this residue as a carbon black base oil are superior to those obtainable by the thermal cracking under like conditions of either of the components making up the feed mixture. Fortuitously, the conditions of thermal cracking most desirable for carbon black oil production are those which are optimum for the production of gasoline.

The intermediate separation zone which follows the cracking furnace is preferably operated at a pressure in the range of 150 to 200 p.s.i.g. A pressure of 195 p.s.i.g. is especially suitable when the furnace is being maintained at 500 p.s.i.g. and a temperature of 920° F. The cracked mixture in the separation zone cools with the expansion to the lower pressure and generally the vapor from the separation zone leaves at a temperature in the range of 825 to 875° F., preferably about 835° F. and the liquid is removed in the same general temperature range, possibly a few degrees lower, to its flashing zone. The vapors from the separation zone are introduced to a lower level of the dephlegmation zone. The downwardly flowing feed (which is admitted at a point near the top of the zone) influences the temperature in the bottom of the zone to the range of say 700 to 800° F. and usually about 725° F. The top of the zone operates at a temperature in the range of 375 to 480 and preferably 400° F.

With reference to Fig. 1, a lubricating oil extract stream is admitted through a line 10 to a storage and mixing tank 12, along with a second stream of heavy catalytically cracked gas oil carried by a line 14. The two streams are admixed in the tank and the feed mixture is removed therefrom through a line 15 to a pressure pump 16 which forces the mixture via a line 17 to an upper level of a conventional dephlegmator 18. The cold feed passes downwardly through the tower in countercurrent flow to a rising vapor stream which is introduced to a lower portion of the tower through a line 20 as described below. The heated feed leaves the bottom of the tower via a line 22 and is forced by a hot oil pump 23 through the coils of a conventional cracking furnace 25. Here, the oil is raised in temperature to about 930° F. in approximately twenty minutes and is removed through a line 27 which is provided with a pressure reducing valve 28 to a vessel 29 which may serve both as a reaction chamber and as a separation zone. Here the pressure is dropped from the cracking furnace inlet pressure of 500 p.s.i.g. to about 200 p.s.i.g. This large drop in pressure effects a separation of the material into a vapor phase which leaves from the top of the vessel through the line 20 and into an enriched aromatic liquid phase which is continuously withdrawn by a line 32 from the bottom of the vessel. The dephlegmator tops which contains as its heavier component an unstabilized pressure distillate, together with lighter materials, leave the dephlegmator via a line 39 and are passed to further processing where the pressure distillate is removed as gasoline. The liquid phase flows through the line 32 containing a pressure reducing valve 35 into a flash tower 34. The pressure on the aromatic-containing liquid drops to substantially atmospheric in the tower, separating a flashed distillate and gas which are removed through a line 36. The aromatic enriched oil is removed from the base of the tower via line 37 and passed to carbon black manufacture or storage.

With reference to Fig. 2, a mixture of a lubricating oil extract and a catalytically cracked gas oil is passed through a line 42 and a heat exchanger 43 to the coils of a thermal cracking furnace 45 where the oil is heated to a temperature of about 925° F. in less than twenty minutes and under a pressure of about 500 p.s.i.g. The thermally cracked material is removed through a line 47 and a pressure reduction valve 51 to a flashing vessel 48 maintained at substantially atmospheric pressure. This large drop in pressure separates from the hot thermally cracked mixture, a vapor phase which leaves from the top of the vessel through a line 49. Line 49 may lead to a fractionator where the gasoline component is separated from the lighter materials and the gas oil. It may be expedient to recycle the gas oil from this latter fractionation to the cracking furnace 45 to obtain maximum gasoline recovery. Approximately 40 to 60% of the thermally cracked stream to the flashing vessel is removed through a bottom line 50 as product suitable for use as a carbon black oil and heat exchanged against the feed stream of the line 42. Straight run aromatic extracts of varying aromatic contents have proven acceptable for use in the process, but generally extracts containing less than 30% aromatics by weight are not recommended and for best results, the aromaticity should be between 40 and 70% on a weight basis. Bright stock extracts containing 50–60% aromatics by weight are especially suitable and extracts from the extraction of high viscosity oils which extracts contain 60–75% aromatics by weight have also been successfully used. Generally, extracts from the manufacture of lubricating oils having viscosities in the range of 50 to 400 SSU at 210° F. are preferred for incorporation in the feed mixture. The aromaticity of both the lubricating extracts and gas oils mentioned herein were determined by the silica gel separation method.

The other component of the feed, namely, the catalytically cracked gas oils (which may be a catalytically cracked slurry oil) will generally contain appreciably less aromatics than the foregoing lubricating oil extracts and usually between 30 and 60% by weight. One particularly useful heavy catalytically cracked gas oil contains about 35% by weight aromatics. This particular gas oil had an API gravity of 25° and a molecular weight of 264. The oil had the following ASTM distillation values: an IBP of 516° F., and 10% and 60% distillation points of 602° F. and 666° F., respectively. Catalytically cracked gas oils of somewhat varying aromatic contents may be employed but preferably the gas oil should contain not less than 30% aromatics by weight.

The advantages of practicing the improved invention are clearly pointed out when the component aromatic containing oils making up the feed mixture needed for practicing this process are individually thermally cracked, as the liquid residium from a thermal cracking of either of the components alone fails to meet the generally accepted specification for a good carbon black oil. This shortcoming will usually be evidenced by a failure to meet the correlation index. A mixing together of the two separately thermally cracked materials does not provide an oil product meeting the generally accepted specification for a good carbon black oil.

*Example*

In order to demonstrate the advantage to be had in treating a mixture of a catalytically cracked gas oil and lubricating oil extract over the separate processing of either component alone, the following runs were made. The several runs were made in the system of Fig. 1 and in each instance the conditions of the cracking furnace were within the temperature range of 920–930° F. and a pressure of about 500 p.s.i.g. The cracking was carried on for approximately 20 minutes. The pressure of the separation zone 29 was maintained at approximately 195 p.s.i.g. and the vapors from the separation zone left at a temperature in the range of about 830–837° F. and the liquid was removed through line 32 at a slightly lower temperature. The recycled ratio was about 2.5 parts of the light oil fraction to 1 part of the feed mixture. The liquid flowing through pipe 32 from the separation zone 29 was flashed to substantially atmospheric pressure in the vessel 34 with the carbon black oil product being removed from the bottom of that vessel. Four runs of different feeds and feed mixtures were examined. A description of the several feeds and feed mixtures and an analysis of their respective carbon black oil products appear in the table below. With reference to the earlier specification for a good carbon black oil, it will be seen from the table that in each run where a single component of the mixture is processed alone, the resulting product failed to meet the correlation index requirement of 110–133, whereas in the processing of the several mixtures, this important specification is consistently obtained.

We claim as our invention:

1. A process for the production of a highly aromatic base oil suitable for carbon black manufacture comprising preparing a feed mixture containing substantial proportions of a catalytically cracked gas oil and a straight run aromatic extract, each of said components having at least 30% by weight of aromatic hydrocarbons and with the weight ratio of the two components of the mixture being between 70–30 and 30–70 and with neither of said components having been subjected before preparation of the feed mixture to either a separate hydrogenation or a separate non-catalytic, thermal cracking, subjecting the mixture to a severe thermal cracking operation for a period of time less than 30 minutes, and separating the lighter material in a substantially atmospheric pressure separation from the thermally cracked mixture to obtain a highly aromatic residue suitable for carbon black manufacture and having overall carbon black base oil characteristics superior to that obtainable by the thermal cracking of either of the components separately.

2. A process in accordance with claim 1 wherein the thermal cracking is at a temperature in the range of 910–950° F. and in a pressure range of about 250–550 p.s.i.g.

3. A process for the production of a highly aromatic base oil suitable for carbon black manufacture comprising preparing a feed mixture of a catalytically cracked gas oil and a lubricating oil extract, each of said components containing at least 30% by weight aromatic hydrocarbons, with the weight ratio of said components of the mixture being between 70–30 and 30–70 and with neither of said components having been subjected before preparation of the mixture to either a separate hydrogenation or a separate non-catalytic, thermal cracking, subjecting the feed mixture to a thermal cracking operation in a cracking zone at a temperature in the range of 910–950° F. and at a pressure in the range of about 300–550 p.s.i.g. for a period of time less than 30 minutes, removing the cracked mixture to a second zone maintained at a pressure substantially lower than the cracking pressure and there separating the cracked mixture to obtain a vapor phase and a liquid phase, withdrawing the liquid phase to a flashing zone wherein the pressure is reduced to substantially atmospheric to provide as product a high aromatic residue suitable for carbon black manufacture and having overall carbon black base oil characteristics superior to that obtainable by the thermal cracking of either of the components separately, passing the vapor phase from the cracked mixture separation to a fractionation zone wherein said vapor phase is divided into fractions containing gasoline and light oil, and recycling the light oil fraction to the cracking zone.

4. A process as defined in claim 3 wherein the cracking is carried on in the more narrow range of 920–935° F.

5. A process as defined in claim 3 wherein the recycled ratio of the light oil fraction to the feed mixture is in the range of 1.5:1 to 3.5:1.

| Type of feed | 1 | 2 | 3 | 4 |
|---|---|---|---|---|
| | 100% Cat. Cracked Gas Oil | 100% Bright Stock Extract | 50% Cat. Cracked Gas Oil and 50% Bright Stock Extract | 40% Cat. Cracked Gas Oil and 60% Bright Stock Extract |
| Gravity, °API | 7.9 | 4.9 | 4.3 | 2.5 |
| Viscosity, SSU at 210° F. | ¹18.7 | ²105 | 56.1 | 110 |
| Asphaltenes, Percent w | | | 9.6 | 9.3 |
| Carbon Residue, Percent w | | | 11.3 | 12.4 |
| Correlation Index | 99 | 97 | 110 | 112 |
| Sulfur, Percent w | 1.4 | 1.1 | 1.4 | 1.5 |
| Ash, Percent w | Nil | 0.1 | 0.01 | Nil |
| Pour Point, ° F | | | 15 | 30 |

¹ SSF at 122° F.
² SSF at 210° F.

References Cited in the file of this patent

UNITED STATES PATENTS 2,764,527     Steele et al.     Sept. 25, 1956
2,772,219     Dunkel et al.     Nov. 27, 1956